(12) United States Patent
Buchanan et al.

(10) Patent No.: US 9,780,354 B2
(45) Date of Patent: Oct. 3, 2017

(54) BATTERY ELECTRODE MATERIAL AND METHOD FOR MAKING THE SAME

(75) Inventors: Mark Buchanan, Oslo (NO); Geir Helgesen, Finstadjordet (NO); Matti Knaapila, Drammen (NO); Preben J.S. Vie, Stange (NO); Gorm Krogh Johnsen, Lillestrom (NO); Rahul Fotedar, Kjeller (NO)

(73) Assignee: CONDALIGN AS, Kjeller (NO)

( * ) Notice: Subject to any disclaimer, the term of this patent is extended or adjusted under 35 U.S.C. 154(b) by 750 days.

(21) Appl. No.: 13/996,781

(22) PCT Filed: Dec. 21, 2011

(86) PCT No.: PCT/EP2011/073621
§ 371 (c)(1),
(2), (4) Date: Jun. 21, 2013

(87) PCT Pub. No.: WO2012/085105
PCT Pub. Date: Jun. 28, 2012

(65) Prior Publication Data
US 2013/0316245 A1    Nov. 28, 2013

(30) Foreign Application Priority Data
Dec. 21, 2010 (NO) .................................. 20101791

(51) Int. Cl.
*H01M 4/04* (2006.01)
*H01M 4/62* (2006.01)

(52) U.S. Cl.
CPC ....... *H01M 4/0416* (2013.01); *H01M 4/0457* (2013.01); *H01M 4/621* (2013.01); *H01M 4/624* (2013.01)

(58) Field of Classification Search
None
See application file for complete search history.

(56) References Cited

U.S. PATENT DOCUMENTS 5,777,292 A * 7/1998 Grigorov ................. H01B 1/12
204/157.15
7,828,619 B1 * 11/2010 Yeh ....................... B82Y 30/00
445/49

(Continued)

FOREIGN PATENT DOCUMENTS

WO    WO 2006/057704 A2    6/2006

OTHER PUBLICATIONS

U.S. Appl. No. 13/380,189, filed May 25, 2012, Svasand, et al.
(Continued)

*Primary Examiner* — Alix Eggerding
(74) *Attorney, Agent, or Firm* — Oblon, McClelland, Maier & Neustadt, L.L.P.

(57) ABSTRACT

The invention concerns a method for manufacturing of a battery electrode material comprising the steps of: a) applying an electric field to at least one polymer, conductive particles and at least one solvent whereby said conductive particles become arranged between the electrodes in at least two lines that are oriented in the same direction as the electric field line, and b) stabilizing the at least one polymer, conductive particles and at least one solvent by removing at least some of said at least one solvent while maintaining the electric field in step a) whereby the at least two lines of conductive particles will remain in their position when said electric field is removed. Further, the invention concerns a battery electrode material comprising at least one polymer and conductive particles, wherein said conductive particles form at least two lines that are oriented parallel and/or co-linear to each other.

25 Claims, 2 Drawing Sheets

(56) References Cited

U.S. PATENT DOCUMENTS

2007/0062029 A1*   3/2007   Ito .......................... H01M 4/04
                                                              29/623.5
2009/0038832 A1    2/2009   Chaffins et al.
2012/0231178 A1    9/2012   Svasand et al.

OTHER PUBLICATIONS

International Search Report issued Apr. 5, 2012 in PCT/EP2011/073621.
Search Report issued Jul. 21, 2011 in Norwegian Patent Application No. 20101791.
Zhi-Tao Wang, et al., "Electric field-treated MEAs for improved fuel cell performance", Journal of Power Sources, vol. 186, No. 2, Jan. 15, 2009, XP025839930, pp. 293-298.

\* cited by examiner

BATTERY ELECTRODE MATERIAL AND METHOD FOR MAKING THE SAME

TECHNICAL FIELD

The present invention relates to electrode materials. More specifically, the invention relates to battery electrode materials and to a method for forming such battery electrode materials.

BACKGROUND OF THE INVENTION

Electrochemical devices for energy storage and energy conversion such as batteries and fuel cells contain electrodes and electrolytes to transport and harvest charges. These elements are electrically conductive, ionically conductive or both. These processes may be limited either by the electrode and membrane material's inherent conductivity level or a non-optimal electrode configuration or both.

Rechargeable batteries (or electrochemical cells) contain two electrodes which are connected through an electrolyte. These components may be prepared from a variety of materials but in general the electrode-electrolyte interface often limits efficiency of charge transport. If this interface was larger and if the distance between the electrodes was smaller, the charge transport would be more efficient.

A better electrode design would therefore be influential in improving the battery function.

U.S. Pat. No. 7,828,619 discloses a method for preparing a nanostructured composite electrode through electrophoretic deposition, and electrodes prepared by such a method. A material comprising nanoparticles and carbon nanotubes having a high aspect ratio is directly deposited on the electrode and contains no polymer.

The Journal of Power Sources, 186 (2009), pages 293-298 discloses electric field assisted fabrication of membrane electrode assemblies (MEAs) for fuel cells. Electrodes are produced in which conductive particles are aligned in an ionomer polymer upon application of an electric field. Nothing is mentioned about batteries.

WO 2010/151141 discloses a method for manufacturing an electrostatic discharge device comprising a layer of conductive particles in a cross linked polymer matrix. The method involves curing of the polymer.

In contrast to a fuel cell, which will function as long as fuel and oxygen are supplied to it, a battery will be discharged upon use. Cost and environmental concerns make rechargeable batteries attractive. Other important aspects of batteries are weight and performance after a number of charge/discharge cycles. Batteries having a low weight and/or retaining a high percentage of their initial charge after a large number of charge/discharge cycles are desirable. Common battery electrodes contain carbon and binder in order to improve conductivity. However, the carbon and binder together often constitute approximately 50% of the battery electrode material thereby contributing to the weight of the electrode and eventually the battery. It would be desirable to decrease the battery electrode weight while maintaining and/or improving the battery performance.

SUMMARY OF THE INVENTION

It is an object of the present invention to overcome or at least mitigate some of the disadvantages of the prior art.

Accordingly, in a first embodiment of the invention there is provided a method for manufacturing of a battery electrode material comprising the steps of:

a) applying an electric field to at least one polymer, conductive particles and at least one solvent whereby said conductive particles become arranged between the electrodes in at least two lines that are oriented in the same direction as the electric field line, and b) stabilizing the least one polymer, conductive particles and at least one solvent by removing at least some of said at least one solvent while maintaining the electric field in step a) whereby the at least two lines of conductive particles will remain in their position when said electric field is removed.

The present invention is based on the insight that subjecting a mixture comprising at least one polymer and randomly distributed conductive particles to an electric field results in alignment of the conductive particles. In this document, the terms align and alignment are intended to mean that the conductive particles form lines that are oriented in the same or substantially the same direction as the electric field line. It is to be understood that in the context of the lines the term "oriented in the same direction as the electric field line" means that the lines are co-linear or parallel to the electric field line or deviate from the electric field line with an angle of 45° or less. For instance, the direction may be in-plane or out-of-plane as described below. The lines of particles may be co-linear or parallel to each other. The alignment of conductive particles into lines results in conductive pathways in the polymer. Thus, the conductivity will be high in the direction of the lines of conductive particles and low or non-existing in the direction perpendicular to said lines of conductive particles; i.e. the formed battery electrode material will be anisotropic with respect to the direction of conductivity. The pathways are able to enhance the macroscopic conductivity of the material. In particular, the formation of conductive pathways allows the battery electrode material to become conductive also when it contains a lower amount of conductive particles than is otherwise necessary for creating an electrical contact for the material when it contains randomly distributed conductive particles. The amount of conductive particles may thereby be reduced and may be at least ten times lower than the percolation threshold. Concentrations of conductive particles may be in the range of 0.2-10 vol %, 0.2-2 vol %, or 0.2-1.5 vol %. In this document, the percolation threshold is defined as the lowest concentration of conductive particles in the polymer necessary to achieve long range conductivity in a system where the conductive particles are randomly distributed. In this document, long range conductivity refers to the conductivity of the composite comprising conductive particles and at least one polymer. Thus, an advantage associated with the method and battery electrode material of the present invention is that conductivity may be achieved with lower amounts of conductive particles compared to a system using randomly distributed particles. In addition to the reduced amount of conductive particles, this also allows for reducing the amount of binder leading to a battery of less weight and having a higher energy density.

In a further embodiment, there is provided a method as defined hereinbefore or hereinafter wherein the at least one polymer, conductive particles and at least one solvent are mixed prior to being placed between the electrodes in step a).

In a further embodiment, there is provided a method as defined hereinbefore or hereinafter wherein the at least one polymer, conductive particles and at least one solvent are mixed after being placed between the electrodes in step a).

In a further embodiment of the invention, there is provided a method as defined hereinbefore or hereinafter wherein at least one of the at least two lines of conductive particles is straight. In this document, a straight line of particles is defined as a line of particles lacking lines of particles branching out from it.

In still a further embodiment of the invention, there is provided a method as defined hereinbefore or hereinafter wherein at least one of the at least two lines of conductive particles is dendritic. By dendritic is understood that at least one further line of particles branches out from the straight line of particles.

The electric field may be created between electrodes that can be placed either in direct contact with one or both sides of the least one polymer, conductive particles and at least one solvent or outside additional insulating layers. The electrodes may be removed after formation of the battery electrode material.

The direction of the electric field may be determined by the electrode arrangement leading to a specific orientation of the lines of conductive particles.

The lines of conductive particles may extend between the electrodes in an in-plane or out-of-plane direction. When the lines of conductive particles extend in a co-linear or substantially parallel fashion with the electrodes they are said to be aligned in an in-plane alignment. When the lines of conductive particles extend in a perpendicular or substantially perpendicular fashion with the electrodes they are said to be aligned in an out-of-plane alignment.

In a further embodiment of the invention the method as defined hereinbefore or hereinafter further comprises a step comprising supporting said at least one polymer, conductive particles and at least one solvent on a support.

The support may be a glass table, an electrode, a conductive metal foil or an electrode comprising a conductive metal foil. The conductive metal foil may comprise aluminium or copper.

The supporting of the said at least one polymer, conductive particles and at least one solvent on a support includes spreading in order to obtain a layer. The layer may be uniform or non-uniform. The maximum thickness of the layer may be between 5 μm (micrometer) and 2 cm (centimeter). In a further embodiment the maximum thickness of the layer may be between 5 μm and 2 mm (millimetre). In still a further embodiment the maximum thickness of the layer may be between 10 μm and 2 mm.

It will be appreciated that steps a) and b) in the method as defined hereinbefore or hereinafter may at least partly overlap. No or little alignment of the lines of particles will take place if the electric field is in step b) is turned off too early. Step b) may be continued after turning off the electric field in step b) in order to further dry the electrode material after alignment of the lines of conductive particles. The skilled person will understand that the time for drying in step b) will depend on factors such as temperature, pressure, thickness of the layer and the solvent being used. Typically, a layer having a thickness of approximately 50 μm is dried for five minutes between 50 to 100° C., such as 80° C., under atmospheric pressure when the solvent is N-methyl-2-pyrrolidine.

The at least one polymer in the mixture may be a conductive or non-conductive polymer. For instance, the conductive polymer may be an ionomer such as Nafion®. Further, the at least one polymer may be a single kind of polymer or a mixture of different polymers. Suitable polymers include, but are not limited to, polyvinyldifluoride (PVDF), carboxymethylcellulose (CMC), styrene butadiene rubber (SBR), poly(3,4-ethylenedioxythiophene) (PEDOT), polyacrylic acid (PAA) and alginate. The at least one polymer may be curable or non-curable. It will be appreciated that when the at least one polymer is a curable polymer then the removal of the solvent in step b) in the method as defined hereinabove or hereinafter will take place in such a way that no curing takes place.

Thus, in a further embodiment of the invention there is provided a method as defined hereinbefore or hereinafter in which the at least one polymer will not undergo curing when the least one polymer, conductive particles and at least one solvent is stabilized in step b).

Yet, in a further embodiment of the invention there is provided a method as defined hereinbefore or hereinafter wherein the at least one polymer in step a) is a non-curable polymer The conductive particles are infusible particles such as carbon particles or metal particles. Examples of conductive carbon particles include, but are not limited to, carbon-black, nanocones, carbon nanotubes, graphene particles or disk-like carbon particles. Examples of conductive metal particles include, but are not limited to, silver or iron and oxides thereof. The metallic conductive metal particles may be metallic powders. Further, the conductive particles may be electronically or ionically conductive. The conductive particles may be the same or different.

In a further embodiment of the invention, the conductive particles have a low aspect ratio. However, the invention is not limited to conductive particles having a low aspect ratio. In this document, the aspect ratio is defined as the ratio between the largest linear dimension of a particle such as a conductive particle and the largest dimension perpendicular to said largest dimension. "Low aspect ratio" as used herein refers to an aspect ratio that is equal to or less than 20:1. In a further embodiment of the invention, low aspect ratio refers to an aspect ratio that is equal to or less than 10:1. In a further embodiment of the invention, low aspect ratio refers to an aspect ratio that is equal to or less than 5:1.

In a further embodiment of the invention, the at least one solvent in step a) in the method as defined hereinbefore or hereinafter is water or an organic solvent such as hexane or mixtures thereof. The organic solvent may be miscible or immiscible with water. Further, the organic solvent may be protic or non-protic.

In a further embodiment of the invention, the at least one solvent is N-methyl-2-pyrrolidone (NMP).

In a further embodiment of the invention, there is provided a method according to any previous embodiment, wherein step a) further comprises active particles. The active particles may be the same or different. By active particles is meant particles giving the battery its ability to store lithium ions. Upon application of the electric field in step a) the active particles may align together with the conductive particles. Examples of active particles include, but are not limited to platinum, lithium-metal oxides such as $LiCoO_2$, $LiMn_2O_4$, and $Li(Ni_xMn_yCo_z)O_2$, vanadium oxides, olivines such as such as $LiFePO_4$, sulphur, borates such as $LiFeBO_3$, flouro silicates such as $LiFeSiO_4F$, lithium, graphite, graphene, lithium-alloying materials, intermetallics, nitrides, oxides, hydrides or silicon.

According to a further embodiment of the invention, there is provided a method according to any embodiment wherein the electric field is of the order of 0.01 to 35 kV/cm.

According to a further embodiment of the invention, there is provided a method according to any embodiment wherein the electric field is of the order of 0.1 to 10 kV/cm.

According to a further embodiment of the invention, there is provided a method according to any embodiment wherein the electric field is of the order of 0.1 to 5 kV/cm.

According to a further embodiment of the invention, there is provided a method according to any embodiment wherein the electric field in step a) is a DC field.

Alternatively, according to a further embodiment of the invention, there is provided a method according to any embodiment wherein the electric field in step a) is an AC field.

According to a further embodiment of the invention, there is provided a method according to any embodiment wherein the electric field has a frequency between 1 Hz and 100 MHz.

According to a further embodiment of the invention, there is provided a method according to any embodiment wherein the electric field has a frequency of 10 Hz.

According to a further embodiment of the invention, there is provided a method according to any embodiment wherein the electric field has a frequency of 10 Hz.

According to a further embodiment of the invention, there is provided a method according to any embodiment wherein removing the at least some of said solvent is performed by evaporation, heating or a combination thereof. The evaporation may be performed under atmospheric or reduced pressure. Heating may take place during the evaporation.

According to a further embodiment of the invention, there is provided a method according to any embodiment wherein removing the at least some of the said solvent is performed by heating at 50 to 100° C. at atmospheric pressure. In an embodiment of the invention, there is provided a method as defined hereinbefore or hereinafter wherein removing the at least some of the said solvent is performed by heating at 60 to 80° C. at atmospheric pressure. Yet, in an embodiment of the invention there is provided a method as defined hereinbefore or hereinafter in which substantially all of said at least one solvent is removed during step b).

According to a further embodiment of the invention, there is provided a method according to any previous embodiment wherein the viscosity in step a) is between 0.1 and 12.000 cPa·s. The unit cPa·s means centiPascal·second.

According to a further embodiment of the invention, there is provided a method according to any previous embodiment wherein the viscosity in step a) is between 500 and 1400 cPa·s.

According to a further embodiment of the invention, there is provided a method according to any previous embodiment wherein the viscosity in step a) is between 1200 and 500 cPa·s. Further, the heating may take place at 70° C. at atmospheric pressure during approximately 20 to 25 minutes.

The present invention also concerns a battery electrode material comprising a polymer such as a non-cured polymer and conductive particles, wherein said conductive particles are aligned to form at least two lines that are co-linear and/or parallel to each other.

In a further embodiment of the invention, there is provided a battery electrode material as defined hereinbefore or hereinafter in which the non-cured polymer is a non-curable polymer.

In a further embodiment of the invention, there is provided a battery electrode material as defined hereinbefore or hereinafter wherein at least one of the at least two lines is straight. Alternatively, there is provided a battery electrode material wherein at least one of the at least two lines is dendritic.

It will be appreciated that the battery electrode material as defined hereinbefore or hereinafter and/or produced in accordance with the method as defined hereinbefore or hereinafter may be used in any kind of battery. In a further embodiment of the invention the battery electrode material produced in accordance with the method as defined hereinbefore or hereinafter may be used in a lithium battery.

According to another embodiment of the invention, there is provided a battery electrode material as defined hereinbefore or hereinafter wherein the at least one polymer is selected from the group consisting of polyvinyldifluoride (PVDF), carboxymethylcellulose (CMC), styrene butadiene rubber (SBR), poly(3,4-ethylenedioxythiophene) (PEDOT), polyacrylic acid (PAA) and alginate.

According to another embodiment of the invention, there is provided a battery electrode material as defined hereinbefore or hereinafter wherein the conductive particles are electronically or ionically conductive.

According to another embodiment of the invention, there is provided a battery electrode material as defined hereinbefore or hereinafter wherein the conductive particles have a low aspect ratio.

According to another embodiment of the invention, there is provided a battery electrode material as defined hereinbefore or hereinafter further comprising active particles. The active particles may be the same or different. The active particles may be randomly distributed in the battery electrode material. Alternatively, the active particles may form lines of active particles or lines of active particles and conductive particles. Examples of active particles include, but are not limited to catalyst particles such as platinum, lithium-metal oxides such as $LiCoO_2$, $LiMn_2O_4$, and $Li(Ni_xMn_yCo_z)O_2$, vanadium oxides, olivines such as such as $LiFePO_4$, sulphur, borates such as $LiFeBO_3$, flouro silicates such as $LiFeSiO_4F$, lithium, graphite, graphene, lithium-alloying materials, intermetallics, nitrides, oxides, hydrides or silicon.

In a further embodiment of the invention, there is provided the use of a battery electrode material as defined hereinbefore or hereinafter in a lithium battery.

In a further embodiment of the invention, there is provided a battery electrode material obtainable according to the method as defined hereinbefore or hereinafter.

DETAILED DESCRIPTION

In one embodiment of the invention, the method as defined hereinabove or hereinafter comprises the mixing of infusible conductive particles and a mixture that contains at least one polymer and at least one solvent, and the electric field alignment of conductive particles in this mixture and the control of the viscosity of this mixture by evaporating the solvent. This procedure can be applied to battery electrodes and electrolytes to replace isotropically distributed conductive particles by thin wires of aligned assemblies of conductive particles. These situations are illustrated in FIGS. 1 and 2.

Figure 1:
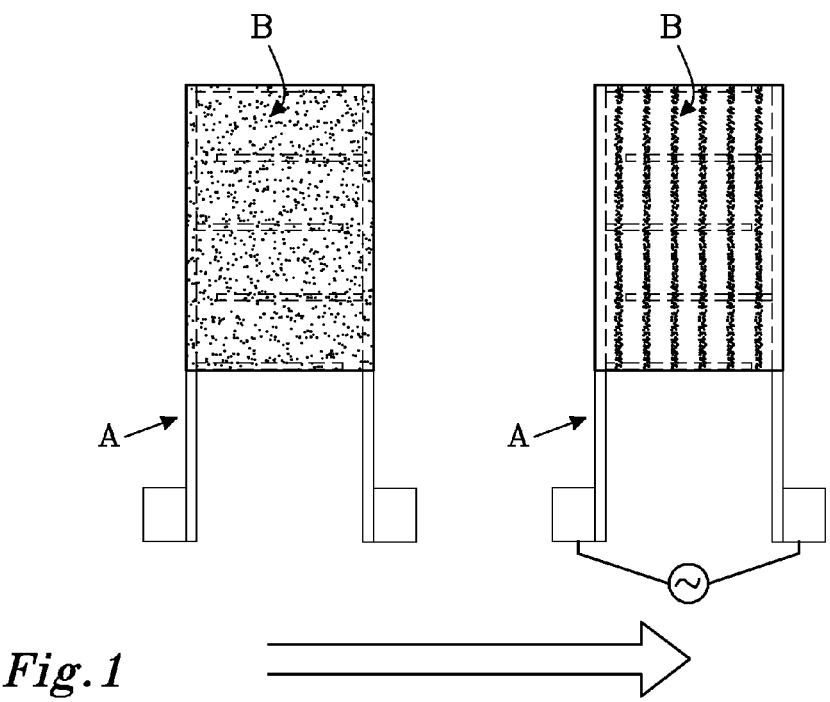
FIG. 1 shows schematics of the employed alignment procedures for in-plane alignment.
Figure 2:
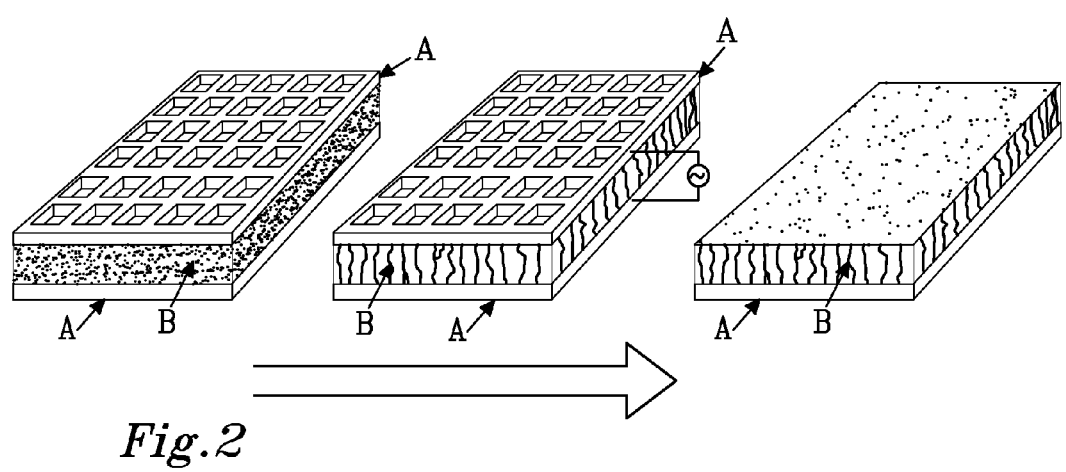
FIG. 2 shows schematics of the employed alignment procedures for out-of-plane alignment.

FIG. 1 shows schematics of the employed alignment procedures for in-plane alignment. This displays how randomly distributed conductive particles B mixed with at least one polymer and at least one solvent between electrodes A become arranged into lines of conductive particles B upon application of an electric filed. This figure is for illustrative purposes only, and all of the lines shown may not be formed The solvent may be evaporated in order to obtain a solid material comprising at least one polymer with conductive pathways being lines of conductive particles. The lines of conductive particles extend in a co-linear or substantially parallel fashion with the electrodes and are said to be aligned in an in-plane alignment FIG. 2 shows schematics of the employed alignment procedures for out-of-plane alignment. This displays how randomly distributed conductive particles mixed with at least one polymer and at least one solvent between electrodes A become arranged into lines B upon application of an electric filed. The solvent may be evaporated in order to obtain a solid material comprising at least one polymer with conductive pathways being lines of conductive particles. The electrodes may be provided with holes to allow for evaporation of solvent through the holes. The alignment be also be performed in such a way that at least one of the electrodes is not in direct contact with the conductive particles, the at least one polymer and the at least one solvent. The lines of conductive particles extend in a perpendicular or substantially perpendicular fashion with the electrodes and are said to be aligned in an out-of-plane alignment.

The resultant aligned material retains anisotropic properties with respect to directional electrical conductivity. In this way, aligned conductive microstructures of originally infusible particles which do not allow alignment as such are formed.

Figure 3:
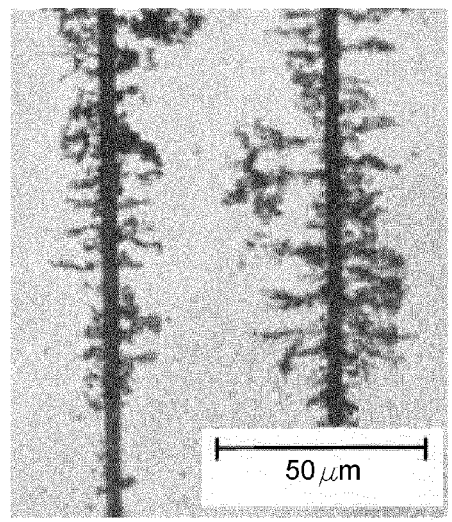
FIG. 3 illustrates conductive dendritic structures maximizing the contact area.

FIG. 3 illustrates dendritic structures maximizing the contact area between conductive lines and the at least one polymer.

Figure 4:
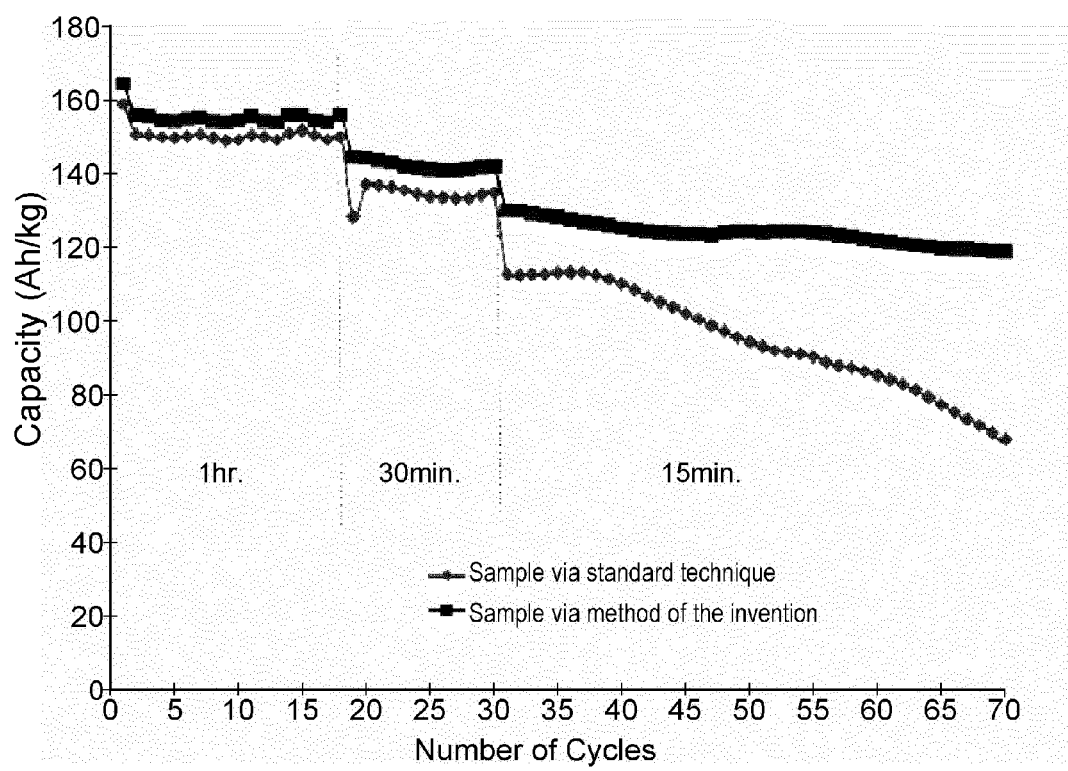
FIG. 4 shows the life time performance of a $LiFePO_4$ electrode cycled at an increasing charge/discharge time.

FIG. 4 shows the life time performance of a $LiFePO_4$ electrode prepared according to the method of the invention and a $LiFePO_4$ electrode prepared according to a standard technique cycled at an decreasing charge/discharge time. The electrode prepared according to the method of the invention contains lines of conductive particles whereas the electrode prepared according to a standard technique contains randomly distributed particles. As shown in the figure, the electrode prepared according to the method of the invention retains its capacity to a larger extent than the electrode prepared according to the standard technique.

Further modifications of the invention within the scope of the claims would be apparent to a skilled person. For example, an isotropic material could be manufactured by carrying out the method according to an embodiment of the invention two or more times applying an electric field in different directions. For example, a conducting lattice structure could be formed throughout the material. Further, the method as defined hereinbefore or hereinafter may be used to provide a plurality of conducting lines in a piece of material or to control the conductivity of a piece of material. For instance, the method may be used to create a more highly conducting zone in a piece of material.

The invention is illustrated, but not limited, by the following Examples.

EXAMPLES

Example 1

This example concerns the use of electric field alignment where the alignment is in-plane alignment when preparing polymeric materials in films and membranes with low fraction of electrically conductive particles.

This example concerns the preparation of a mixture of conductive particles and polymer matrix that in this example is a polyelectrolyte in solvent; the solvent can be a high alcohol such as propanol.

The conductive particles are aligned in the polymer matrix and this alignment enhances the conductivity of material in the alignment direction.

This example, moreover, shows change of the viscosity of the obtained material, by evaporating the solvent, so that the alignment and directional conductivity can be obtained in the alignment step is maintained.

The employed conductive particles were carbon nanocones from n-Tec AS or carbon black from Alfa Aesar.

The employed polymer was the ionomer Nafion® IQ-1105 (5 wt. % in ethanol).

The particles and polymer were mixed such that the particle fraction was 2 vol. % that is at about the percolation threshold of these particles. This mixture was stirred by a magnetic stirrer at room temperature for 15 minutes and visually uniform mixture was obtained.

This mixture was spread over the interdigidated gold electrodes on glass substrate. The electrode width was 10 µm and the electrode spacing 100 µm. The maximum thickness of the film had a value between 50 and 500 µm.

Alignment was done using 1 kHz field of 0.2 kV/cm.

The system was stabilized by letting the solvent evaporate during the alignment. This means that the electric field was kept on until the solvent was completely evaporated. At about 25° C., this took 3 minutes for a 100 µm thick film.

Example 2

This example is similar to example 1 but instead of using carbon particles at about their percolation threshold, ten times less of material is used. The conductivity increased from $\sim 10^{-3}$ S/m to $\sim 10^{-2}$ S/m.

Example 3

This example is similar to the examples 1 and 2 but instead of in-plane geometry shown in FIG. 1, the out-of-plane alignment geometry shown in FIG. 2 was used. While the in-plane geometry may provide substrate support to the aligned wires, this is absent in the out-of-plane geometry where wires have translational freedoms perpendicular to the alignment direction. The alignment occurs regardless the geometry, which means that the alignment does not require substrate support.

Example 4

This example is similar to the examples 1-3 but instead of mere carbon particles, carbon particles with platinum catalyst were used. Platinum catalyst does not influence on alignment but the results are identical to those obtained with carbon particles without platinum catalyst.

Example 5

This example concerns partially grown conductive wires in electrodes. In this example particles are grown by an electric field on the current collector surface thus maximizing the available electrode surface area.

The growth of aligned wires begins from the electrodes. In this case the alignment was performed using alternating field (1 kV/cm) but particle fraction is kept so low that there are not enough particles to form wires from electrode to electrode. This fraction depends on the particle-polymer pair but is about 0.1 vol. % or less for the 100 μm electrode spacing. In this case, the alignment electrodes become covered by wires that reach the polymer matrix but not the opposite electrode.

These branched wires become an inherent part of alignment electrodes whose surface area is thus substantially increased.

The obtained "dendritic" electrodes are illustrated in FIG. 3.

The invention claimed is:

1. A method for manufacturing a battery electrode material, comprising
   a) applying an electric field to a mixture comprising at least one polymer, conductive particles and at least one solvent whereby said conductive particles become arranged between the electrodes in at least two lines that are oriented in the same direction as the electric field line, and
   b) stabilizing the at least one polymer, conductive particles and at least one solvent by removing at least some of said at least one solvent while maintaining the electric field in step a) whereby the at least two lines of conductive particles remain in their position when said electric field is removed,
   wherein the at least one polymer is selected from the group consisting of polyvinyldifluoride, carboxymethylcellulose, styrene butadiene rubber, poly(3,4-ethylenedioxythiophene), polyacrylic acid and alginate.

2. The method according to claim 1, further comprising supporting said mixture comprising at least one polymer, conductive particles and at least one solvent on a support.

3. The method according to claim 1, wherein the at least one polymer is a non-cured polymer.

4. The method according to claim 1, wherein the conductive particles are electronically or ionically conductive.

5. The method according to claim 1, wherein in step a) the mixture further comprises active particles.

6. A method for manufacturing a battery electrode material, comprising
   a) applying an electric field to a mixture comprising at least one polymer, conductive particles and at least one solvent whereby said conductive particles become arranged between the electrodes in at least two lines that are oriented in the same direction as the electric field line, and
   b) stabilizing the at least one polymer, conductive particles and at least one solvent by removing at least some of said at least one solvent while maintaining the electric field in step a) whereby the at least two lines of conductive particles remain in their position when said electric field is removed,
   wherein the conductive particles have a low aspect ratio.

7. The method according to claim 6, further comprising supporting said mixture comprising at least one polymer, conductive particles and at least one solvent on a support.

8. The method according to claim 6, wherein the at least one polymer is a non-cured polymer.

9. The method according to claim 6, wherein the conductive particles are electronically or ionically conductive.

10. The method according to claim 6, wherein in step a) the mixture further comprises active particles.

11. A method for manufacturing a battery electrode material, comprising
   a) applying an electric field to a mixture comprising at least one polymer, conductive particles and at least one solvent whereby said conductive particles become arranged between the electrodes in at least two lines that are oriented in the same direction as the electric field line, and
   b) stabilizing the at least one polymer, conductive particles and at least one solvent by removing at least some of said at least one solvent while maintaining the electric field in step a) whereby the at least two lines of conductive particles remain in their position when said electric field is removed,
   wherein the at least one solvent is N-methyl-2-pyrrolidone.

12. The method according to claim 11, further comprising supporting said mixture comprising at one least polymer, conductive particles and at least one solvent on a support.

13. The method according to claim 11, wherein the at least one polymer is a non-cured polymer.

14. The method according to claim 11, wherein the conductive particles are electronically or ionically conductive.

15. The method according to claim 11, wherein in step a) the mixture further comprises active particles.

16. A method for manufacturing a battery electrode material, comprising
   a) applying an electric field to a mixture comprising at least one polymer, conductive particles and at least one solvent whereby said conductive particles become arranged between the electrodes in at least two lines that are oriented in the same direction as the electric field line, and
   b) stabilizing the at least one polymer, conductive particles and at least one solvent by removing at least some of said at least one solvent while maintaining the electric field in step a) whereby the at least two lines of conductive particles remain in their position when said electric field is removed,
   wherein the viscosity of the mixture in step a) is between 0.1 and 12,000 cPa·s.

17. The method according to claim 16, further comprising supporting said mixture comprising at least one polymer, conductive particles and at least one solvent on a support.

18. The method according to claim 16, wherein the at least one polymer is a non-cured polymer.

19. The method according to claim 16, wherein the conductive particles are electronically or ionically conductive.

20. The method according to claim 16, wherein in step a) the mixture further comprises active particles.

21. A method for manufacturing a battery electrode material, comprising
   a) applying an electric field to a. mixture comprising at least one polymer, conductive particles and at least one solvent whereby said conductive particles become arranged between the electrodes in at least two lines that are oriented in the same direction as the electric field line, and
   b) stabilizing the at least one polymer, conductive particles and at least one solvent by removing at least some of said at least one solvent while maintaining the electric field in step a) whereby the at least two lines of conductive particles remain in their position when said electric field is removed,
   wherein the electric field is of the order of 0.1 to 10 kV/cm.

22. The method according to claim 21, further comprising supporting said mixture comprising at least one polymer, conductive particles and at least one solvent on a support.

23. The method according to claim 21, wherein the at least one polymer is a non-cured polymer.

24. The method according to claim 21, wherein the conductive particles are electronically or ionically conductive.

25. The method according to claim 21, wherein in step a) the mixture further comprises active particles.

* * * * *